United States Patent Office 3,758,400
Patented Sept. 11, 1973

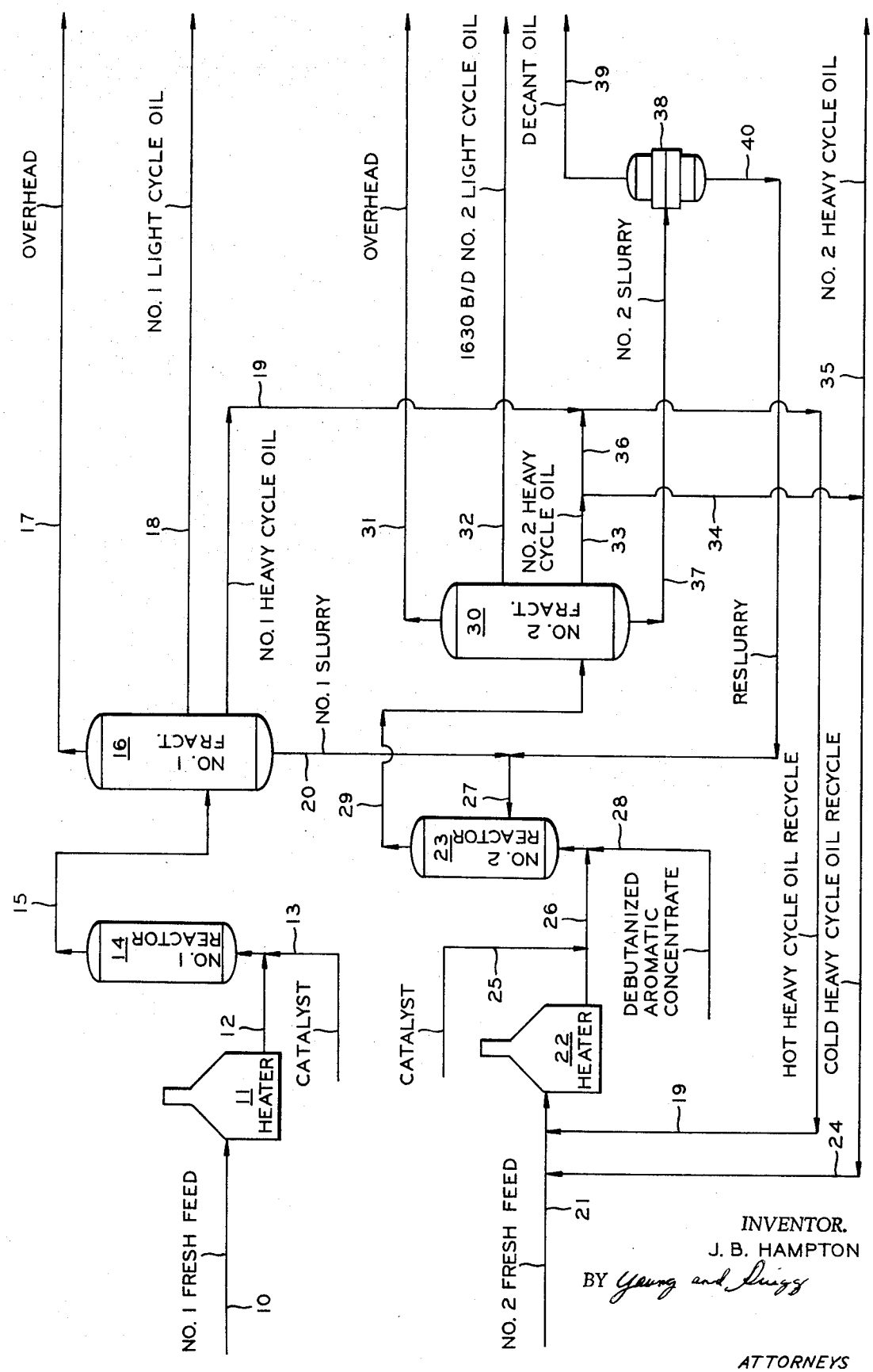

3,758,400
CATALYTIC CRACKING PROCESS
Joe B. Hampton, Sweeny, Tex., assignor to
Phillips Petroleum Company
Filed Aug. 2, 1971, Ser. No. 167,921
Int. Cl. C10g *31/14, 37/04*
U.S. Cl. 208—72        6 Claims

ABSTRACT OF THE DISCLOSURE

Cracking of hydrocarbon oils in fluid catalytic cracking units in the presence of a small, but finite, amount of an aromatic concentrate containing olefinic hydrocarbons results in a substantial increase in the production of higher quality products, especially gasoline products of an increased octane number.

---

This invention relates to the catalytic conversion of hydrocarbons of relatively high molecular weight into hydrocarbon products of lower boiling molecular weight and boiling range. In accordance with another aspect, this invention relates to charging to a catalytic cracking operation an octane-improving amount of an aromatic concentrate containing a substantial portion of olefinic hydrocarbon. In accordance with another aspect, this invention relates to admixing an aromatic concentrate highly concentrated with aromatics, olefins and diolefins with hot hydrocarbon oil feed charged to a catalytic cracking zone to increase the production of additional quantities of higher octane gasoline. In accordance with a still further aspect, this invention relates to the injection of a debutanized aromatic concentrate containing olefinic hydrocarbons into the riser of a fluid catalytic cracking unit operating on recycle gas oil stock to form gasoline, alkylation feed, lower paraffins, and hydrogen with hydrogenation of the olefinic hydrocarbons in the aromatic concentrate with attendant production of additional quantities of higher octane gasoline.

Catalytic cracking processes of many types are well known in the art and have been widely practiced for a long time in the petroleum industry, particularly for the production of motor fuel range hydrocarbons from heavier hydrocarbon oils, mostly in the gas oil or higher boiling ranges. These processes normally employ such catalysts as various natural or treated clays, various composites of silica gel with alumina, magnesia and/or boria, activated alumina, etc. at temperatures of about 700–1100 F., pressures ranging from subatmospheric to several hundred atmospheres, and widely varying feed rates and fixed bed, moving bed, fluid catalyst, or a suspensoid operation, specific conditions depending upon the character of the feed and the products desired.

There are continuing efforts by the petroleum industry to improve the product characteristics and properties so as to render various processes, and particularly catalytic cracking processes, more economical. For example, the industry is continually working to improve the octane value of the gasoline products produced. In the present state of development in which the country is looking for ways of reducing smog and other atmospheric pollutants, it appears that the elimination of much of the lead content of gasolines may be desirable. The increase in octane number of gasoline produced which would require no, or only a small amount of, octane improvement chemicals (potential atmospheric contaminants) would be of considerable advantage.

One of the less valuable products formed in the cracking of light hydrocarbons such as ethane, propane and butane to ethylene is a side product known as debutanized aromatic concentrate (DAC). This concentrate is highly concentrated with aromatics, olefins and diolefins, and it would be desirable to find some process for using this material which would upgrade it and make it more valuable as a salable product.

In accordance with the invention, it has been found that the octane number of gasoline products produced from catalytic cracking operations can be substantially increased by carrying out the cracking of hydrocarbon oil feeds in the presence of an octane-improving amount of a debutanized aromatic concentrate which contains a substantial percentage of olefinic hydrocarbons and diolefinic hydrocarbons.

Accordingly, an object of this invention is to provide an improved process for the conversion of hydrocarbon oils to more valuable products such as gasolines.

Another object of this invention is to improve the octane quality of the gasolines produced in catalytic cracking operations.

A further object of this invention is to provide a commercially feasible method for improving catalytic cracking operations to produce high quality gasoline products.

A further object of this invention is to utilize low value aromatic concentrate and produce more valuable salable products therefrom.

Other aspects, objects and the several advantages of the invention will be apparent to those skilled in the art on further study of the specification, the drawing, and the appended claims.

In accordance with the invention, an aromatic concentrate rich in olefinic hydrocarbons and hydrocarbon feed oils is charged to a catalytic cracking zone to maximize production of alkylation feed and improve the octane value and quantity of gasoline products produced.

In accordance with one embodiment of the invention, a debutanized aromatic concentrate containing olefinic and diolefinic hydrocarbons is mixed with hot hydrocarbon feed oil and hot cracking catalyst and then charged together to a catalytic cracking zone to form gasoline, alkylation feed, lower paraffins, and hydrogen, resulting in the hydrogenation of at least a portion of the aromatic concentrate with attendant production of additional quantities of higher octane gasoline.

In accordance with a specific embodiment of the invention, a debutanized aromatic concentrate rich in olefinic and diolefinic hydrocarbons in amounts up to about 10 weight percent is introduced into the riser of a fluid catalytic cracking unit and admixed with hot hydrocarbon feed oil such as a recycle gas oil stock and hot cracking catalyst and then charged together to the catalytic cracking zone with an increase in production of additional quantities of higher octane gasoline.

It has been found that by injection of debutanized aromatic concentrate, for example, into the riser of a fluid catalytic cracking unit which contains recycle stocks which crack, forming gasoline, alkylation feed, lower paraffins, and hydrogen, permits increased alkylation feed and gasoline compared to blending the concentrate with normal gas oil charging stocks. It has also been found that additional benefits obtained by the reduction of fouling of feed preheat exchangers and furnace tubes since the aromatic concentrate is admixed with hot hydrocarbon feed oil and hot cracking catalyst shortly prior to entry into the fluid catalytic cracking unit.

The amount of debutanized aromatic concentrate introduced into the catalytic cracking zone along with hydrocarbon oil will range up to about 10 volume percent of the oil feed. The amount of aromatic concentrate admixed with the hydrocarbon oil feed will often range from about 0.05 to 5 volume percent, and the amount added will depend upon the amount of olefinic hydrocarbons present in the aromatic concentrate.

The catalytic cracking operation of the invention can be carried out at temperatures ranging from about 800 to about 1100° F., pressures of from about 0 to about 100 p.s.i.g., and liquid feed rates of about 0.2 to 5 volumes per volume of catalyst per hour.

Conventional catalytic cracking feedstocks such as paraffinic, naphthenic, or mixed base gas oils, or heavier hydrocarbon oils such as reduced crudes, topped crudes, recycle gas oils, and the like can be used according to the invention for the production of high octane motor fuels. The invention is particularly applicable to hydrocarbon feed oils, higher boiling than gasoline, which normally boil above about 600° F., and is particularly applicable to recycle gas oil stocks which upon cracking form substantial amounts of hydrogen, which hydrogen is available for the hydrogenation of the olefinic and diolefinic hydrocarbons present in the aromatic concentrate added to the catalytic cracking zone.

While all types of conventional cracking catalysts mentioned can be employed, silica-alumina catalysts are preferred. Catalysts used in the process can comprise acid treated bentonite and synthetic silicate-alumina catalysts which are stable at high temperatures of the order of 1300° F. to 1600° F. which are substantially free from alkali and alkaline earth metals. A satisfactory catalyst is the synthetic silica-alumina catalyst containing about 87 percent $SiO_2$ and about 13 percent $Al_2O_3$.

A preferred source of the debutanized aromatic concentrates suitable for use in the present invention is a side product of an ethylene production unit which uses ethane and/or propane and/or butane cracking feedstock. An aromatic concentrate particularly well suited for this invention is a fraction having an aromatic content of about 30 to 70 volume percent, an API gravity at 60° F. ranging from 25 to 35, a distillation range at 760 mm. Hg with an initial boiling point of about 120° F. and an end point of about 420° F. The olefinic and diolefinic concentration in the concentrate will ordinarily range from 3 to 30 volume percent.

A typical aromatic concentrate produced in the cracking of ethane, propane and butane to form ethylene after fractionation to remove butane and lighter components has the following properties:

| | |
|---|---|
| Gravity | 29.4 |
| I.B.P., °F. | 122 |
| Percent: | |
| 5 | 150 |
| 10 | 160 |
| 20 | 174 |
| 40 | 206 |
| 50 | 224 |
| 90 | 370 |
| E.P. | 414 |
| Component: | |
| Total butanes _____LV percent | 0.5 |
| Hexanes + _____do | 83.3 |
| Pentanes _____do | 16.2 |

It will be obvious to one skilled in the art in possession of this disclosure that various equivalent oils and steps of operation can be substituted within the scope of the appended claims without departing therefrom.

The drawing is a diagrammatic or schematic flow plan in which there are shown principal streams in an embodiment of the invention in which two catalytic cracking zones are employed, followed by separate fractionation zones.

Referring now to the drawing, a feed composed of virgin gas oil is passed by way of line 10 to heater 11 wherein its is heated substantially to conversion conditions and then passed by way of line 12 together with catalyst introduced by line 13 to reactor 14. The fresh feed can be heated in heater 11 to a temperature of the order of about 600° F. and mixed with hot catalyst which has been returned from regeneration and subjected in reactor 14 to cracking conditions of about 900-950 F. The reaction products are removed from reactor 14 by way of line 15 and passed to fractionator 16 wherein the lighter components comprising gas and gasoline fractions are yielded overhead by way of line 17. The side draw comprising light cycle oil is removed from fractionator by way of line 18.

A heavy cycle oil is removed from fractionator 16 by way of line 19 and is passed to further heating prior to introduction into the second catalytic cracking unit. A slurry oil which can contain some catalyst is removed from the base of fractionator 16 by way of line 20 and it, too, is passed as at least a portion of the feed for the second catalytic cracking unit.

A second fresh hydrocarbon feed is passed by way of line 21 to heater 22 for preheating prior to introduction into a second catalytic cracking reactor 23. The fresh feed in line 21 is supplemented with hot cycle oil introduced by way of line 19 and cold heavy cycle oil introduced by way of line 24. The total hydrocarbon feed passed through heater 22 is heated to a temperature of about 630°–650° F. and is mixed with hot catalyst introduced by line 25 into line 26 and then passed to second catalytic cracking unit reactor 23. Additional cracking feed comprising a slurry oil is introduced into reactor 23 by way of line 27.

In accordance with the invention, a debutanized aromatic concentrate as defined herein is introduced into the riser to reactor 23 by way of line 28.

The reaction products are removed overhead from reactor 23 by way of line 29 and passed to fractionator 30. An overhead fraction is removed from fractionator 30 by way of line 31. The overhead fraction comprises gas components and gasoline fractions. A light cycle oil is yielded as a side draw by way of line 32 and a heavy cycle oil by way of line 33. The heavy cycle oil in line 33 is split, part being passed by way of line 34 so that some of this stream can be recycled to heater 22 or yielded as heavy cycle oil product by way of line 35. The remainder of the heavy cycle oil removed from fractionator 30 is passed by way of line 36 and introduced into line 19 for recycle to heater 22.

A heavy slurry oil is removed from the base of fractionator 30 by way of line 37, passed to separator 38 wherein the lighter components separate and are removed overheat as decant oil by way of line 39. The heavier material is removed from separator 38 by way of line 40 and recycled to reactor 23 by way of line 27.

In a plant operation utilizing a flow as described above with introduction of debutanized aromatic concentrate of the invention by way of line 28, the following typical operating data were employed.

| | No. 1 reactor | No. 2 reactor |
|---|---|---|
| Bed temperature, °F. | 950 | 945 |
| Oil charge temperature, °F. | 600 | 620 |
| Space velocity | 5.00 | 1.49 |
| Catalyst/oil wt. ratio | 4.5 | 4.2 |
| Catalyst circ., T./M. | 18.31 | 8.45 |
| Coke burned, wt. percent of total reactor charge | 4.43 | 7.88 |
| Stripping steam, lbs./hr | 9,592 | 4,557 |
| Injection steam, lbs./hr | 8,962 | 4,758 |

GAS OIL CHARACTERISTICS

| | Gas oil | No. 1 heavy cycle | No. 2 heavy cycle | No. 1 slurry | No. 2 reslurry |
|---|---|---|---|---|---|
| Gravity, °API | 28.3 | 28.8 | 24.6 | 21.0 | 14.3 |
| ASTM Dist.: | | | | | |
| IBP | 496 | 539 | 480 | | |
| 10% | 578 | 585 | 595 | | |
| 30% | 645 | 610 | 618 | | |
| 50% | 696 | 628 | 631 | | |
| 70% | | 646 | 645 | | |
| 90% | | 685 | 673 | | |
| LV at 700° | 51.7 | 93.4 | 95.3 | | |
| LV at 470° | 0 | | | | |
| LV at 610° | 19.1 | | | | |

In a plant operation in which 515 barrels per day of a debutanized aromatic concentrate as defined above was charged to a fluid catalytic cracking unit resulted in over 700 barrels per day of additional salable product and with an octane number increase from an estimated 97.5 to 98.3 research octane number plus 3 ccs. of TEL. For comparison, plant operation without debutanized aromatic concentrate introduced as set forth below compares the plant operation with 515 barrels per day of debutanized aromatic concentrate charged directly into the riser for the No. 2 reactor or reactor 23 in the above drawing.

|  | Run A | | Run B | |
|---|---|---|---|---|
|  | BPSD | LV percent fresh feed | BPSD | LV percent fresh feed |
| Conversion | 24,760 | 79.04 | 25,723 | 80.80 |
| Fresh feed | 31,325 | 100.00 | 31,835 | 100.00 |
| Total charge | 37,509 | 119.75 | 37,884 | 119.00 |
| Propylene | 2,393 | 7.64 | 2,402 | 7.55 |
| Propane | 904 | 2.89 | 896 | 2.82 |
| Butylene | 2,665 | 8.51 | 2,721 | 8.55 |
| Isobutane | 2,006 | 6.41 | 2,165 | 6.80 |
| n-Butane | 632 | 2.02 | 667 | 2.10 |
| Pentanes to alkyl | 1,965 | 6.28 | 2,156 | 6.77 |
| Stabilized gasoline | 16,315 | 52.08 | 17,043 | 53.54 |
| Light cycle oil | 4,870 | 15.55 | 4,225 | 13.60 |
| Heavy cycle oil | 376 | 1.20 | 547 | 1.82 |
| Decant | 1,319 | 4.21 | 1,340 | 4.91 |
| Total liquid recovery | 33,448 | 106.78 | 34,164 | 107.32 |
| Residue gas wt. percent, FF | | 3.51 | | 3.59 |
| Coke burned wt. percent, FF | | 7.07 | | 7.16 |
| Loss wt. percent, FF | | .78 | | .00 |

In the above data, Run B was carried out with the addition of debutanized aromatic concentrate to the reactor feed. It will be noted from the above tabulation that the catalytic cracking according to the invention with the addition of aromatic concentrate resulted in approximately 716 barrels per day of additional salable products. Additionally, the octane number of the gasoline recovered was increased from 97.5 to 98.3 RON plus 3 cc. TEL. By subjecting the aromatic concentrate to cracking in the presence of hydrogen, the diolefins present in the concentrate are saturated and are converted to alkylation feed and gasoline, thereby increasing the yield of valuable products. A portion of the products recovered from the overhead from the second fractionator can be subsequently alkylated to produce an alkylate product. The fraction can be subjected to alkylation with any conventional catalytic alkylation of isoparaffins with olefins using, for example, HF or other catalysts.

I claim:

1. In a process for converting hydrocarbon-containing oils by catalytic cracking to more valuable products and for increasing the octane number of the gasoline products produced which comprises charging to said catalytic cracking, as reactant feed, a hydrocarbon oil feed and an octane improving amount in the range of 0.5 to about 10 volume percent, based on total hydrocarbon oil reactant feed, of a debutanized aromatic concentrate characterized by a high concentration of olefins and diolefins in the range of 3 to 30 volume percent of said concentrate, an aromatics content of 30 to 70 volume percent of said concentrate, a boiling range of about 100–450° F. at 760 mm. Hg, and an API gravity at 60° F. ranging from 25 to 35.

2. A process according to claim 1 wherein said hydrocarbon oil feed and said aromatic concentrate are mixed and then charged to a catalytic cracking zone along with a cracking catalyst.

3. A process according to claim 1 wherein said hydrocarbon oil feed is a recycle oil and which recycle oil upon being subjected to cracking yields sufficient hydrogen to at least partially saturate the olefins and diolefins present in said aromatic concentrate with attendant production of alkylation feed and additional quantities of higher octane gasoline.

4. A process according to claim 1 wherein the aromatic concentrate is a debutanized side product of an ethylene production unit cracking ethane, propane and butane feedstock having an API gravity of about 30, an initial boiling point of about 120° F., an end boiling point of about 420° F., and approximately 50 weight percent benzene and toluene, with the remainder being principally olefinic materials, and which concentrate is blended with a recycle hydrocarbon oil feed and catalyst in the riser fluid catalytic cracking zone.

5. A process according to claim 1 wherein said aromatic concentrate is introduced into a riser of a fluid catalytic cracking unit containing heated hydrocarbon oil feed and hot cracking catalyst being charged to said unit.

6. A process according to claim wherein said debutanized aromatic concentrate is fed to the riser containing hot recycle hydrocarbon oil and hot cracking catalyst of a second fluid catalytic cracking unit, which receives at least a portion of its feed from the first catalytic cracking unit, cracking virgin hydrocarbon oil stocks so as to increase the yield of higher octane gasoline products from both units.

References Cited

UNITED STATES PATENTS

| 2,464,810 | 3/1949 | Hirsch et al. | 208—113 |
| 2,941,936 | 6/1960 | Harper | 208—74 |
| 3,200,062 | 8/1965 | Britton | 208—87 |
| 3,340,178 | 9/1967 | Hornaday et al. | 208—89 |
| 3,360,587 | 12/1967 | Adams | 260—683 |
| 3,654,137 | 4/1972 | Dober et al. | 208—87 |
| 3,310,592 | 3/1967 | Fukuda et al. | 260—672 |
| 3,451,922 | 6/1969 | Parker | 208—57 |
| 3,470,085 | 9/1969 | Parker | 208—143 |
| 3,537,981 | 11/1970 | Parker | 208—143 |

DELBERT E. GANTZ, Primary Examiner

G. E. SCHMITKONS, Assistant Examiner

U.S. Cl. X.R.

208—77, 113, 120; 260—683 R